(12) United States Patent
Haaf et al.

(10) Patent No.: US 12,365,551 B2
(45) Date of Patent: Jul. 22, 2025

(54) METHOD FOR CONTROLLING THE OPERATION OF AN INDUSTRIAL ROBOT

(71) Applicant: Gerhard Schubert GmbH, Crailsheim (DE)

(72) Inventors: Volker Haaf, Crailsheim (DE); Daniel Greb, Crailsheim (DE)

(73) Assignee: Gerhard Schubert GmbH, Crailsheim (DE)

( * ) Notice: Subject to any disclaimer, the term of this patent is extended or adjusted under 35 U.S.C. 154(b) by 270 days.

(21) Appl. No.: 17/998,757

(22) PCT Filed: May 10, 2021

(86) PCT No.: PCT/EP2021/062346
§ 371 (c)(1),
(2) Date: Nov. 14, 2022

(87) PCT Pub. No.: WO2021/228773
PCT Pub. Date: Nov. 18, 2021

(65) Prior Publication Data
US 2023/0192421 A1   Jun. 22, 2023

(30) Foreign Application Priority Data
May 15, 2020 (DE) .................. 10 2020 113 278.6

(51) Int. Cl.
*B25J 9/00* (2006.01)
*B25J 9/16* (2006.01)
*B65G 47/90* (2006.01)

(52) U.S. Cl.
CPC .......... *B65G 47/905* (2013.01); *B25J 9/1697* (2013.01)

(58) Field of Classification Search
CPC .............. B65G 47/905; B25J 9/1697; G05B 2219/40053; G05B 2219/40607; G05B 2219/40532; G05B 2219/45063
See application file for complete search history.

(56) References Cited

U.S. PATENT DOCUMENTS

| | | | |
|---|---|---|---|
| 2010/0004778 A1 | 1/2010 | Arimatsu et al. | |
| 2013/0151007 A1* | 6/2013 | Valpola | B25J 13/08 901/9 |
| 2013/0166061 A1 | 6/2013 | Yamamoto | |
| 2013/0238125 A1* | 9/2013 | Suzuki | B25J 9/1697 700/253 |
| 2017/0032220 A1 | 2/2017 | Medasani et al. | |
| 2019/0210224 A1* | 7/2019 | Zanchettin | B25J 9/1666 |

(Continued)

FOREIGN PATENT DOCUMENTS

| | | |
|---|---|---|
| DE | 112017007025 T5 | 10/2009 |
| DE | 112009001414 T5 | 4/2011 |

(Continued)

OTHER PUBLICATIONS

International Search Report and Written Opinion dated Aug. 2, 2021, pertaining to Int'l Patent Application No. PCT/EP2021/062346, 15 pgs.

*Primary Examiner* — Khoi H Tran
*Assistant Examiner* — Tien Minh Le
(74) *Attorney, Agent, or Firm* — DINSMORE & SHOHL LLP

(57) ABSTRACT

Method for controlling the operation of an industrial robot configured in particular to carry out pick-and-place or singulation tasks.

11 Claims, 2 Drawing Sheets

(56) References Cited

U.S. PATENT DOCUMENTS

2020/0206913 A1* 7/2020 Kaehler .................. G06F 18/24
2020/0238519 A1* 7/2020 Diankov ................ B25J 9/1697

FOREIGN PATENT DOCUMENTS

| DE | 202017106506 U1 | 4/2018 |
| DE | 102016009030 B4 | 5/2019 |
| EP | 1816604 A2 | 8/2007 |
| EP | 3515671 B1 | 5/2020 |

* cited by examiner

METHOD FOR CONTROLLING THE OPERATION OF AN INDUSTRIAL ROBOT

CROSS-REFERENCE TO RELATED APPLICATIONS

This application is a national stage entry of PCT/EP2021/062346 filed May 10, 2021, which claims the benefit of German Patent Application No. DE 10 2020 113 278.6 filed May 15, 2020, the entire disclosures of which are hereby incorporated herein by reference.

FIELD

The disclosure relates to a method for controlling the operation of an industrial robot configured, in particular, to carry out pick-and-place or singulation tasks, wherein the industrial robot comprises a handling device comprising at least one handling element for handling an object to be transferred from a first orientation and/or position to a second orientation and/or position.

BACKGROUND

Corresponding methods for controlling the operation of industrial robots are known in principle from the prior art.

To date, the operation of corresponding industrial robots has typically been controlled via control devices that can be assigned or are assigned to corresponding industrial robots. These control devices are set up to process data supplied to them—these can be, for example, various detection or sensor data—to generate control information. The control information generated in this way is used as the basis for controlling the operation of the industrial robot(s) in question.

Although these known methods allow reliable control of the operation of industrial robots based on corresponding control information, they are in need of improvement as the data-processing resources required to generate corresponding control information, i.e. in particular the memory and computing resources required, are typically very high.

Consequently, there is a need for a method for controlling the operation of an industrial robot which is improved in comparison, in particular with regard to the data-processing resources required to generate corresponding control information, i.e. in particular the required memory and computing resources.

SUMMARY

Proceeding therefrom, the object underlying the present disclosure is to describe an improved method for controlling the operation of an industrial robot, in particular one that is improved with regard to the data-processing resources required for generating corresponding control information, i.e. in particular the required memory and computing resources.

The object is achieved by a method for controlling the operation of an industrial robot according to claim 1. The claims dependent thereon relate to possible embodiments of the method.

A first aspect of the disclosure relates to a method for controlling the operation of at least one industrial robot. A corresponding industrial robot typically comprises a handling device comprising at least one handling element, i.e., for example, a gripping element, suction element, etc., for handling an object to be relocated from a first spatial orientation and/or position to a second spatial orientation and/or position. Accordingly, a corresponding industrial robot is in particular an industrial robot configured to carry out pick-and-place or relocation or singulation tasks. Accordingly, the method is in particular a method for controlling the operation of at least one industrial robot configured to carry out pick-and-place or relocation or singulation tasks.

A corresponding handling device of a corresponding industrial robot can also be referred to or considered as an end effector device, if appropriate. A corresponding handling element can therefore also be referred to or considered as an end effector element, if appropriate.

In embodiments, a corresponding industrial robot can be a collaborative industrial robot ("cobot"). Thus, the method can be implemented for controlling a collaborative industrial robot ("cobot").

The method comprises the steps described in more detail below:

In a first step of the method, a plurality of objects located in a first orientation and/or position is detected and detection data describing the detected plurality of objects located in the first orientation and/or position are generated. Thus, in the first step of the method, detection data are generated that include or describe a plurality of detected objects located in a first orientation and/or position. The objects located in the first orientation and/or position are typically detected by one or more detection devices; thus, one or more detection devices are typically used for performing the first step of the method. The objects located in the first orientation and/or position are typically located in a detection region of the respective detection device(s). A corresponding detection region may, for example, relate to a defined portion or region of a conveyor element, for example belt-like or chain-like, of a conveyor device conveying the particular objects located in the first orientation and/or position. Specifically, a corresponding detection region can relate to a defined portion or region of a, for example belt-like or chain-like, feed element of a feed device feeding the particular objects located in the first orientation and/or position into an action region of a handling element of a handling device of the industrial robot.

The objects detected in the first step of the method can in principle be oriented and/or positioned at least partially, optionally completely, in an ordered or disordered manner.

In a second step of the method, a first data-processing measure is applied to process the detection data, wherein applying the first data-processing measure provides a selection of exactly one object from the plurality of objects located in the first orientation and/or position described by the detection data, and selection information describing exactly the object selected from the plurality of objects located in the first orientation and/or position described by the detection data is generated. Accordingly, in the second step of the method, a first data-processing measure is applied to process the detection data generated in the first step of the method. The detection data generated in the first step of the method are thus processed in the second step of the method on the basis of a first data-processing measure. The application of the first data-processing measure, performed in particular by a data-processing device implemented in terms of hardware and/or software, provides as a result a selection of exactly one object from the plurality of objects located in the first orientation and/or position described by the detection data. The result of the application of the first data-processing measure is thus generated selection information which includes or describes the exactly one object selected from the plurality of objects located in the first orientation and/or position described by the detection data. The generated selection information thus includes or describes (exactly) the object selected from the plurality of objects located in the first orientation and/or position described by the detection data by applying the first data-processing measure.

As will be seen further, one or more selection criteria may be taken into account in the application of the first data-processing measure; hence, a selection of exactly one object from the plurality of objects located in the first orientation and/or position described by the detection data can be made on the basis of or taking into account at least one selection criterion.

The application of the first data-processing measure can include the application of at least one selection algorithm, for example an image processing algorithm, which can, as the case may be, form part of a selection software. A corresponding selection or image processing algorithm can be set up to select exactly one object from the plurality of objects located in the first orientation and/or position described by the detection data. As mentioned, one or more selection criteria can be considered when applying the first data-processing measure. A corresponding selection or image processing algorithm can be set up accordingly to take into account one or more corresponding selection criteria when selecting exactly one object from the plurality of objects located in the first orientation and/or position described by the detection data.

The selection algorithm may be generated or may have been generated within the context of a machine learning process, i.e. via a machine learning method. In the context of a corresponding machine learning process, one or more artificial neural networks with one or more intermediate layers implemented between an input layer and an output layer may be used or may have been used.

In a third step of the method, a second data-processing measure is applied to process the selection information, wherein the application of the second data-processing measure provides at least one coordinate for handling the exactly one object described by the selection information by means of at least one handling element of the handling device of the industrial robot, and coordinate information describing the at least one coordinate is generated. Accordingly, in the third step of the method, a second data-processing measure is applied to process the selection information generated in the second step of the method. The selection information generated in the second step of the method is thus processed in the third step of the method on the basis of a second data-processing measure. The application of the second data-processing measure, carried out in particular by the or a further data-processing device implemented in terms of hardware and/or software, provides as a result at least one coordinate for handling the exactly one object described by the selection information by means of at least one handling element of the handling device of the industrial robot. The result of the application of the second data-processing measure is thus a generated coordinate information which includes or describes at least one coordinate for handling the exactly one object described by the selection information by means of at least one handling element of the handling device of the industrial robot. The generated coordinate information thus includes or describes one or more coordinates—these are typically coordinates related to the particular object—for handling the exactly one object described by the selection information by means of at least one handling element of the handling device of the industrial robot. The coordinates described by the coordinate information can, for example, be world coordinates.

As will be shown in the following, one or more determination criteria can be taken into account in the application of the second data-processing measure; thus, a determination of one or more coordinates for the handling of the exactly one object described by the selection information can take place by means of at least one handling element of the handling device of the industrial robot on the basis of or taking into account at least one determination criterion.

The application of the second data-processing measure can include the application of at least one determination algorithm, for example an image processing algorithm, which can form part of a determination software. A corresponding determination or image processing algorithm can be set up to determine, at the object described by the selection information, suitable coordinates at which the object can be handled, i.e. for example gripped, by means of one or more handling elements of the handling device of the industrial robot. As mentioned, one or more determination criteria may be taken into account in the application of the second data-processing measure. A corresponding determination or image processing algorithm can be set up accordingly to take one or more corresponding determination criteria into account when determining corresponding coordinates.

The determination algorithm may be generated or may have been generated as part of a machine learning process, i.e. via a machine learning method. In the context of a corresponding machine learning process, one or more artificial neural networks with one or more intermediate layers implemented between an input layer and an output layer may be used or may have been used.

In a fourth step of the method, the operation of the industrial robot for carrying out a task, in particular a pick-and-place or singulation task, is controlled on the basis of the coordinate information. The coordinate information is thus incorporated into corresponding control information for controlling the operation of the industrial robot or corresponding control information is generated on the basis of or taking into account the coordinate information. In the fourth step of the method, the coordinate information generated in the third step of the method is used as the basis for controlling the operation of the robot, so that the industrial robot places the relevant handling element or elements of the handling device at the coordinate or coordinates described by the coordinate information in order to relocate the particular object from the first orientation and/or position into a second orientation and/or position. The second orientation and/or position can be specified, for example, by a user or programmer of the industrial robot.

The control of the operation of the industrial robot typically involves or results in the handling of the exactly one object described by the selection information at the coordinate or coordinates described by the coordinate information.

The main advantage of the method described herein is that, already in the second step of the method, a corresponding selection of exactly one object is chosen from the plurality of detected objects described by the detection data. In this way, the data volume to be processed in order to determine the particular coordinates can be considerably reduced or limited to a single object, namely the particular selected object, which also considerably reduces the data-processing resources required to generate corresponding control information, i.e. in particular the memory and computing resources.

In particular, in comparison to approaches known from the prior art for generating corresponding control information on which to base the control of corresponding industrial robots, in which considerable data volumes must be processed, the method described herein already makes it possible in the second step of the method, and thus comparatively early, to considerably reduce the data volume to be processed for generating corresponding coordinate information, in that, by applying the first data-processing measure, exactly one object is selected from the plurality of objects located in the first orientation and/or position described by the detection data. By selecting exactly one object from the plurality of objects located in the first orientation and/or position described by the detection data in the second step of the method, the data volume to be further processed is reduced to the exactly one selected object; the data to be further processed defined by the selection information is thus limited or concentrated to the particular exactly one selected object, so that the further processing of the data is also limited or concentrated only to the particular exactly one selected object.

Due to the reduced data volume, the method can be carried out significantly faster and the required data-processing resources, i.e. in particular the required memory and computing resources, are significantly reduced. Alternatively or additionally, less powerful data processing equipment, in particular in terms of memory and computing power, can be used to carry out the method, if appropriate.

Overall, an improved method for controlling the operation of an industrial robot is provided.

In embodiments, controlling the operation of the industrial robot on the basis of the coordinate information can comprise at least one interaction of the at least one handling element of the handling device of the industrial robot with the object described and thus selected by the respective selection information at or in the region of the at least one coordinate described by the coordinate information. A corresponding interaction can comprise picking up the object described by the respective selection information and thus selected at the coordinate(s) described by the particular coordinate information. In particular, controlling the operation of the industrial robot on the basis of the coordinate information can comprise moving the object described and thus selected by the respective selection information from a first orientation and/or position to a second orientation and/or position by means of the at least one handling element of the handling device of the industrial robot.

The detection of the plurality of objects located in the first orientation and/or position, which takes place in the first step of the method, can be performed by means of at least one optical detection device. Corresponding detection devices can therefore be configured as optical detection devices, i.e. for example as (digital) camera devices, or can comprise them. Corresponding detection devices can comprise one or more detection elements, i.e. for example optical sensor elements, such as CCD and/or CMOS sensors. The objects in the first orientation and/or position can therefore be detected optically in embodiments.

In particular, in the first step of the method, at least one optical detection device can be used which is arranged or formed on the industrial robot which can be controlled or is to be controlled in accordance with the method, i.e. in particular on an immovable or stationary portion of the industrial robot, in particular on a portion of a housing device of the industrial robot which is set up to accommodate functional and/or supply components of the industrial robot. In other words, at least one optical detection device arranged or formed in a positionally fixed manner on the industrial robot can be used, which is advantageous because the positionally fixed arrangement allows a defined optical detection region to be realized in a simple manner. A corresponding positionally fixed arrangement of a corresponding optical detection device is expediently selected at an elevated region relative to the objects to be detected, so that the detection region resulting from the arrangement of the optical detection device relative to the objects to be detected allows a kind of overview of at least some of the objects to be detected, or possibly of all the objects to be detected. For this purpose, an arrangement of the optical detection device on a housing device of the industrial robot of the industrial robot has proven to be expedient. A corresponding housing device can, for example, be arranged or formed on a vertically extending base support of the industrial robot. Functional and/or supply components of the industrial robot, which can be implemented in hardware and/or software, can be arranged or formed on or in a housing device that is sometimes also referred to or considered to be a "head".

In embodiments, at least one optical detection device can be used, which has a defined optical detection region within which objects can be or are detected by means of the detection device. A corresponding optical detection region can, for example, relate to a defined portion or region of a conveyor element, for example belt-like or chain-like, of a conveyor device conveying the particular objects located in the first orientation and/or position. Specifically, a corresponding optical detection region can relate to a defined portion or region of a, for example belt-like or chain-like, feed device feeding the particular objects located in the first orientation and/or position into an action region of a handling element of the handling device of the industrial robot.

Typically, there is at least a qualitative relationship between the size of the optical detection region and the data volume generated by the detection data. In embodiments, an optical detection region can be selected, in particular with regard to its size, in such a way that the data volume generated by the detection data is limited to a certain threshold value. Of course, it is conceivable that an optical detection device with a variable optical detection region is used; thus, an optical detection device can be used which has a first optical detection region and at least one further optical detection region which is different therefrom, at least with respect to the size of the detection region, compared to the first optical detection region.

Basically, the objects to be detected can be detected dynamically or statically; the objects can therefore be detected when they are in motion or when they are not in motion.

The first data-processing measure can be implemented by at least one single- or multi-layer or -level first artificial neural network. A corresponding first artificial neural network has at least one intermediate layer located between an input layer and an output layer. The degree of complexity and, consequently, the performance capability of the particular first artificial neural network(s) can be defined in particular by the number of the respective intermediate layers. In principle, artificial neural networks of (comparatively) simple or (comparatively) complex configuration can be used for implementing the first data-processing measure. The use of corresponding artificial neural networks surprisingly showed particular advantages in investigations in conjunction with the processing of particular detection data for the generation of related selection information.

Alternatively or additionally, the second data-processing measure can be implemented by at least one single- or multi-layer second artificial neural network. A corresponding second artificial neural network has at least one intermediate layer located between an input layer and an output layer. The degree of complexity and, consequently, the performance capability of the particular second artificial neural network(s) can be defined in particular by the number of the particular intermediate layers. In principle, artificial neural networks of (comparatively) simple or (comparatively) complex configuration can be used for implementing the second data-processing measure. The use of corresponding artificial neural networks surprisingly showed particular advantages in investigations in conjunction with the processing of respective selection information for the generation of related coordinate information.

As mentioned, at least one hardware- and/or software-implemented data-processing device set up for applying the first and second data-processing measures can be used for applying the first and second data-processing measures. A corresponding data-processing device can be set up to implement at least one first artificial neural network and/or at least one second artificial neural network or to be implemented by corresponding first and/or second artificial neural networks. A corresponding data-processing device can form part of a control device for controlling the operation of the industrial robot.

As mentioned, one or more selection criteria can be taken into account in the application of the first data-processing measure. Thus, the selection of exactly one object from the plurality of objects located in the first orientation and/or position described by the detection data by means of the first data-processing measure can be performed on the basis of at least one selection criterion. A corresponding selection criterion may represent a boundary condition to be considered in the selection of the exactly one particular object.

An absolute orientation information and/or absolute position information describing an absolute orientation and/or position of at least one object of the objects located in the first orientation and/or position can be used as a corresponding selection criterion. Absolute orientation information and/or absolute position information can, for example, be specified in position angles and/or in world coordinates or can contain these. Thus, an absolute orientation and/or position of at least one object of the objects located in the first orientation and/or position can be detected and used as a selection criterion and accordingly taken into account or used as a basis for the selection of the exactly one object.

Alternatively or additionally, relative orientation information and/or relative position information describing a relative orientation and/or position of at least one object of the objects located in the first orientation and/or position with respect to at least one further object of the objects located in the first orientation and/or position can be used as a corresponding selection criterion. Relative orientation information and/or relative position information can, for example, be specified in position angles and/or in world coordinates or can include these. Thus, a relative orientation and/or position of at least one object of the objects located in the first orientation and/or position with respect to at least one further object of the objects located in the first orientation and/or position can be detected and used as a selection criterion and accordingly taken into account or used as a basis for the selection of the exactly one object.

Alternatively or additionally, approach information describing an approach movement or approach vector of a handling element of the handling device of the industrial robot required in particular from an ACTUAL position and/or ACTUAL orientation for approaching at least one object of the objects located in the first orientation and/or position can be used as a corresponding selection criterion. Thus, an approach movement or approach vector of a handling element of the handling device of the industrial robot, which is required in particular from an ACTUAL position and/or ACTUAL orientation, can be detected and used as a selection criterion and accordingly taken into account or used as a basis for the selection of the exactly one object.

Alternatively or additionally, dimension information describing at least one geometric-structural dimension of at least one object of the objects located in the first orientation and/or position can be used as a corresponding selection criterion. Thus, at least one dimension of at least one object of the objects located in the first orientation and/or position can be detected and used as a selection criterion and accordingly taken into account or used as a basis for the selection of the exactly one object.

Alternatively or additionally, shape information describing at least one geometric-structural shape (spatial shape) of at least one object of the objects located in the first orientation and/or position can be used as a corresponding selection criterion. Thus, at least one shape of at least one object of the objects located in the first orientation and/or position can be detected and used as a selection criterion and accordingly taken into account or used as a basis for the selection of the exactly one object.

Alternatively or additionally, color information describing the color of at least one object of the objects located in the first orientation and/or position can be used as a corresponding selection criterion. Thus, the coloring of at least one object of the objects located in the first orientation and/or position can be detected and used as a selection criterion and accordingly taken into account or used as a basis for the selection of the exactly one object.

Alternatively or additionally, surface information describing the surface, in particular the surface condition, i.e. in particular the mechanical and/or optical surface properties, of at least one object of the objects located in the first orientation and/or position can be used as a corresponding selection criterion. Thus, the surface, in particular the surface condition, of at least one object of the objects located in the first orientation and/or position can be detected and used as a selection criterion and accordingly taken into account or used as a basis for the selection of the exactly one object.

Alternatively or additionally, mass information describing the mass, in particular a center of mass, of at least one object of the objects located in the first orientation and/or position can be used as a corresponding selection criterion. Thus, the mass, in particular a center of mass, of at least one object of the objects located in the first orientation and/or position can be detected and used as a selection criterion and accordingly taken into account or used as a basis for the selection of the exactly one object.

Alternatively or additionally, type information describing the type, sometimes also referred to as the "format" in pick-and-place applications, of at least one object of the objects located in the first orientation and/or position can be used as a corresponding selection criterion. Thus, the type of at least one object of the objects located in the first orientation and/or position can be detected and used as a selection criterion and accordingly taken into account or used as a basis for the selection of the exactly one object.

As mentioned, one or more determination criteria can be taken into account in the application of the second data-processing measure. Thus, the determination of the at least one coordinate for handling the exactly one object described by the selection information by means of the second data-processing measure can be performed on the basis of at least one determination criterion. A corresponding determination criterion may represent a boundary condition to be considered in the determination of the particular coordinate(s).

Absolute orientation information and/or absolute position information describing an absolute orientation and/or position of the selected object can be used as a corresponding determination criterion, for example. Absolute orientation information and/or absolute position information can, for example, be specified in position angles and/or in world coordinates or can include these. Thus, an absolute orientation and/or position of the selected object can be detected and used as a determination criterion and accordingly taken into account or used as a basis for the determination of the coordinate(s).

Alternatively or additionally, relative orientation information and/or relative position information describing a relative orientation and/or position of the particular selected object with respect to at least one further object of the objects located in the first orientation and/or position can be used as a corresponding determination criterion. Relative orientation information and/or relative position information can, for example, be specified in position angles and/or in world coordinates or can include these. Thus, a relative orientation and/or position of the selected object with respect to at least one further object of the objects located in the first orientation and/or position can be detected and used as a determination criterion and accordingly taken into account or used as a basis for the determination of the coordinate(s).

Alternatively or additionally, approach information describing an approach movement or approach vector of a handling element of the handling device of the industrial robot required in particular from an ACTUAL position and/or ACTUAL orientation can be used as a corresponding determination criterion for approaching the selected object. Thus, an approach movement or approach vector of a handling element of the handling device of the industrial robot required in particular from an ACTUAL position and/or ACTUAL orientation for approaching the selected object can be detected and used as a selection criterion and accordingly taken into account or used as a basis for the determination of the coordinate(s).

Alternatively or additionally, dimension information describing at least one geometric-structural dimension of the selected object can be used as a corresponding determination criterion. Thus, at least one dimension of the selected object can be detected and used as a determination criterion and accordingly taken into account or used as a basis for the determination of the coordinate(s).

Alternatively or additionally, shape information describing at least one geometric-structural shape (spatial shape) of the selected object can be used as a corresponding determination criterion. Thus, a shape of the selected object can be detected and used as a determination criterion and accordingly taken into account or used as a basis for the determination of the coordinate(s).

Alternatively or additionally, color information describing the coloring of the selected object can be used as a corresponding determination criterion. Thus, the coloring of the selected object can be detected and used as a determination criterion and accordingly taken into account or used as a basis for the determination of the coordinate(s).

Alternatively or additionally, surface information describing the surface, in particular the surface condition, i.e. in particular the mechanical and/or optical surface properties, of the selected object can be used as a corresponding determination criterion. Thus, the surface, in particular the surface condition, of the selected object can be detected and used as a determination criterion and accordingly taken into account or used as a basis for the determination of the coordinate(s).

Alternatively or additionally, mass information describing the mass, in particular a center of mass, of the selected object can be used as a corresponding determination criterion. Thus, the mass, in particular a center of mass, of the selected object can be detected and used as a determination criterion and accordingly taken into account or used as a basis for the determination of the coordinate(s).

Alternatively or additionally, handling information describing the type of handling of the selected object by at least one handling element of the handling device of the industrial robot can be used as a corresponding determination criterion. Thus, the type of handling of the selected object by at least one handling element of the handling device of the industrial robot can be detected and used as a determination criterion and accordingly taken into account or used as a basis for the determination of the coordinate(s).

Alternatively or additionally, handling information describing the handling surface of the selected object by at least one handling element of the handling device of the industrial robot can be used as a corresponding determination criterion. Thus, the handling surface of the selected object can be detected by at least one handling element of the handling device of the industrial robot and used as a determination criterion and accordingly taken into account or used as a basis for the determination of the coordinate(s).

Alternatively or additionally, type information describing the type of the selected object can be used as a corresponding determination criterion. Thus, the type of the selected object can be detected and used as a determination criterion and accordingly taken into account or used as a basis for the determination of the coordinate(s).

The method typically does not end after the steps described have been performed for a first selected object which, in the course of or after performing the steps of the method described further above, has been selected, for example, from the plurality of objects located in the first orientation and/or position and has been removed as a selected object from the plurality of objects located in the first orientation and/or position in the course of controlling the industrial robot and has been relocated to a second orientation and/or position. Accordingly, after generating corresponding selection information and coordinate information for a first object selected from the plurality of objects located in the first orientation and/or position, corresponding selection information and coordinate information is typically generated for at least one further object from the plurality of objects remaining in the first orientation and/or position. The method is typically performed until corresponding selection information and coordinate information has been successively generated for each object from the plurality of objects located in the first orientation and/or position. Of course, the method can be interrupted or stopped if a termination condition is met or present. A corresponding termination condition can be fulfilled or present, for example, if only a certain number of objects located in the first orientation and/or position is still present or if no object located in the first orientation and/or position is present any more.

Prior to the step of detecting the plurality of objects located in a first orientation and/or position and generating detection data describing the detected plurality of objects located in the first orientation and/or position, the method can comprise a step of providing a plurality of objects in a first orientation and/or position on a stationary or moving support, in particular a support of a conveyor device, in some embodiments a feed conveyor device for feeding objects. Thus, at least optionally, the provision, which may include feeding various objects into an action region of a handling element of the handling device of the industrial robot, may also constitute a step of the method.

In embodiments, corresponding objects can be objects to be packaged in a packaging. The type of packaging is dependent on the type of objects to be packaged. Only by way of example is reference made to singulatable foodstuffs, such as confectionery, as possible objects. In principle, the method can be performed with all objects to be singulated from a plurality of objects located in a first orientation and/or position.

A second aspect of the disclosure described herein relates to an industrial robot, in particular a collaborative industrial robot ("cobot"). The industrial robot comprises a handling device which comprises at least one handling element movable in at least one degree of freedom of movement for handling an object to be relocated from a first orientation and/or position into a second orientation and/or position, and a control device, in particular implemented in hardware and/or software, for controlling the operation of the industrial robot. The control device is configured to perform the method according to the first aspect of the disclosure. The control device thus typically has machine-readable instructions for performing the steps of the method according to the first aspect of the disclosure. All explanations in conjunction with the method according to the first aspect of the disclosure apply similarly to the industrial robot according to the second aspect of the disclosure, and vice versa.

A third aspect of the disclosure described herein relates to an assembly for relocating objects from a first orientation and/or position to a second orientation and/or position. The assembly, which can also be referred to or considered as a machine, comprises at least one industrial robot according to the second aspect of the disclosure. For this purpose, the assembly comprises at least one peripheral device. A corresponding peripheral device can be or can comprise a feed device for feeding objects, in particular objects located in a first orientation and/or position, into an action region of at least one handling element of the handling device of the industrial robot. Alternatively or additionally, a corresponding peripheral device can be or can comprise an outlet device for the outlet of objects, in particular objects that have been relocated into the second orientation and/or position by means of the industrial robot. All the explanations in conjunction with the method according to the first aspect of the disclosure apply analogously to the assembly according to the third aspect of the disclosure, and vice versa.

A corresponding assembly can be or can form part of a packaging machine for packaging objects. A corresponding packaging machine can, for example, be arranged to transfer objects, such as foodstuffs, cosmetic articles, pharmaceutical articles, technical articles, from a first orientation and/or position into a second orientation and/or position, i.e. for example into a carrier-like receiving device.

BRIEF DESCRIPTION OF THE DRAWINGS

The disclosure is explained in more detail in the drawings with reference to exemplary embodiments. The drawings show in.

DETAILED DESCRIPTION

Figure 1:
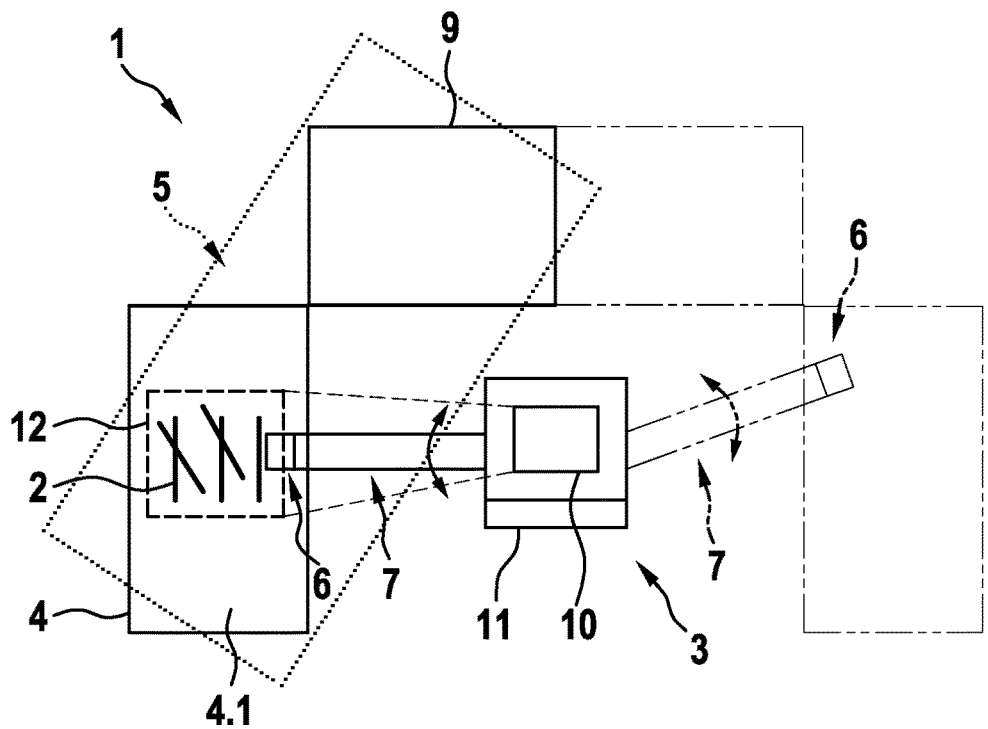
FIG. 1 a schematic representation of an assembly for relocating objects from a first orientation and/or position to a second orientation and/or position according to an exemplary embodiment.

FIG. 1 shows a schematic representation of an assembly 1 for relocating objects 2 from a first orientation and/or position to a second orientation and/or position according to an exemplary embodiment in a plan view. The assembly 1 can also be referred to or considered as a machine.

The assembly 1 comprises an industrial robot 3, for example formed as a collaborative industrial robot ("cobot"), and a plurality of peripherals. In the exemplary embodiment, the corresponding peripherals are a feed device 4, for example in the form of a feed belt, for feeding objects 2, in particular objects 2 located in a first orientation and/or position, into an action region 5 of an end effector element or handling element 6, for example in the form of a gripping or suction element, of an end effector device or handling device 7 of the industrial robot 3, and an outlet device 9, for example in the form of a removal belt, for the outlet of objects 2, in particular objects 2 which have been relocated into a second orientation and/or position by means of the industrial robot.

The end effector element or handling element 6 of the end effector device or handling device 7 is mounted so as to be movable in one or more degrees of freedom of movement, as indicated purely schematically by the double arrow.

In the dashed representation it is indicated that the assembly 1 can also comprise a plurality of corresponding peripherals as well as a plurality of corresponding end effector devices or handling devices 7 together with the associated end effector element or handling element 6.

Figure 2:
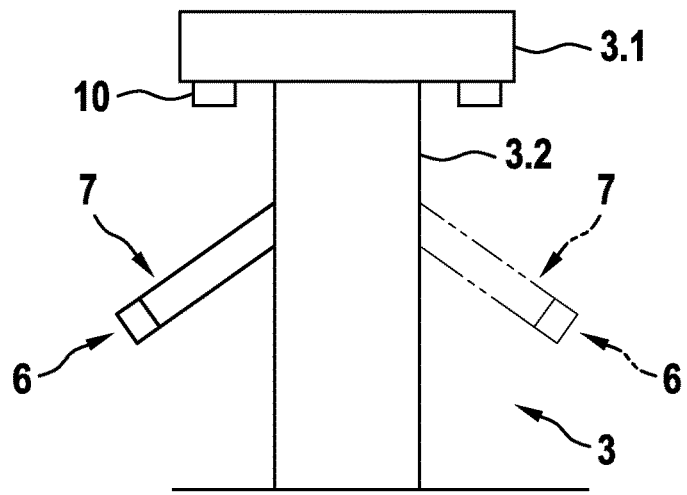
FIG. 2 a schematic representation of an industrial robot according to an exemplary embodiment.

FIG. 2 shows a schematic representation of an industrial robot 3 according to an exemplary embodiment in a side view. FIG. 2 again shows the end effector device or handling device 7, for example in the form of a robot arm or comprising such an arm, together with the associated end effector element or handling element 6. The industrial robot 3 shown in FIG. 2 can correspond to the industrial robot 3 shown in FIG. 1.

FIG. 2 shows a housing device 3.1 arranged or formed on a base support 3.2, arranged or formed in a vertically extending manner, of the industrial robot 3. Functional and/or supply components (not shown) of the industrial robot 3, which can be implemented in hardware and/or software, can be arranged or formed on or in the housing device 3.1, which can also be referred to or considered as the "head".

FIG. 2 also shows an optical detection device 10, for example in the form of a camera device or comprising such a camera device, which is arranged or formed on the housing device 3.1. The optical detection device 10 is thus arranged or formed on a portion of the housing device 3.1 and thus on an immovable or stationary portion of the industrial robot 3. A corresponding positionally fixed arrangement of the optical detection device 10 is therefore selected in the exemplary embodiment at an elevated region relative to the objects 2 to be detected, so that the optical detection region 12 resulting from the arrangement of the optical detection device 10 relative to the objects 2 to be detected allows a kind of overview of at least some of the objects 2 to be detected, and possibly of all the objects 2 to be detected.

In the dashed illustration it is again indicated that the industrial robot 3 can also comprise a plurality of corresponding end effector devices or handling devices 7 together with associated end effector elements or handling elements 6 as well as a plurality of corresponding optical detection devices 10.

Returning to FIG. 1, a control device 11 implemented in terms of hardware and/or software can be seen, which is set up to control the operation of the industrial robot 3. The control device 11 shown in FIG. 1 in a purely exemplary manner as a structural component of the industrial robot 3 is thus set up to generate control information on the basis of which the operation of the industrial robot 3 is controlled for performing certain tasks. Such tasks may, for example, be pick-and-place or singulation tasks of objects 2.

Figure 3:
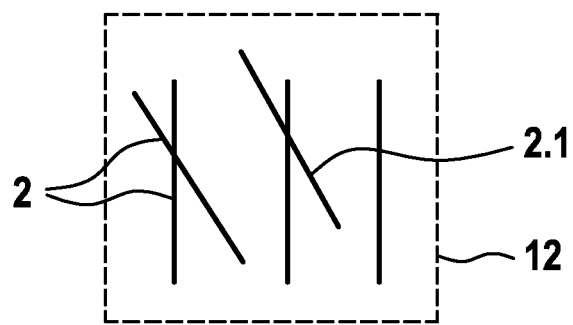
FIG. 3 a schematic representation of a plurality of objects located in a first orientation and/or position detected by a detection device according to an exemplary embodiment.
Figure 4:
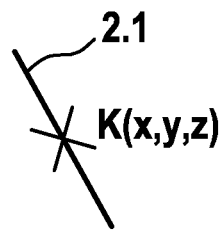
FIG. 4 an object selected from the plurality shown in FIG. 3.
Figure 5:
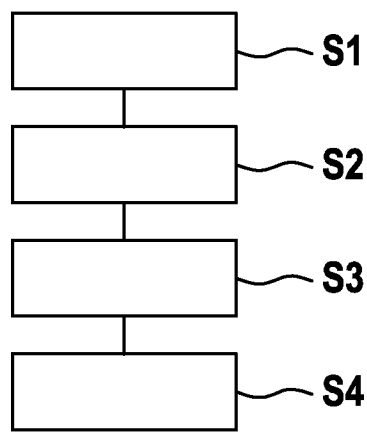
FIG. 5 a block diagram for illustrating a method for controlling the operation of an industrial robot according to an exemplary embodiment.

The control device 11 is accordingly set up for performing a method for controlling an industrial robot 3, which is explained in greater detail below on the basis of an exemplary embodiment, also with reference to FIGS. 3-5.

The method comprises the steps described in greater detail below:

In a first method step S1 of the method, detection data are generated which include or describe a plurality of detected objects 2 located in a first orientation and/or position. The objects 2 located, for example, on a surface of the feed device 4 in the first orientation and/or position are detected for this purpose via one or more optical detection devices 10; consequently, one or more optical detection devices 10 are used to perform the first step of the method. The objects 2 located in the first orientation and/or position are located in a detection region 12 of at least one optical detection device 10, said detection region being shown with dashed lines in FIG. 1 and separately in FIG. 3. It is evident that a corresponding detection region 12 can relate to a defined portion or region of a, for example belt-like or chain-like, feed element 4.1, of the feed device 4 feeding the particular objects 2 located in the first orientation and/or position into the action region 5 of a handling element 6 of the handling device 7 of the industrial robot 3.

The objects 2 detected in the first method step of the method can in principle be oriented and/or positioned at least partially, optionally completely, in an ordered or disordered manner.

In a second method step S2 of the method, a first data-processing measure is applied to process the detection data generated in the first method step S1 of the method. The detection data generated in the first method step S1 of the method are thus processed in the second method step of the method S2 on the basis of a first data-processing measure. The application of the first data-processing measure, performed in particular by a data-processing device implemented in terms of hardware and/or software, provides as a result a selection of exactly one object 2.1 from the plurality of objects 2 located in the first orientation and/or position described by the detection data (cf. FIG. 3). The result of the application of the first data-processing measure is thus generated selection information which includes or describes exactly one object 2.1 selected from the plurality of objects 2 located in the first orientation and/or position described by the detection data. The generated selection information therefore includes or describes the (exactly) one object 2.1 that was selected from the plurality of objects 2 located in the first orientation and/or position described by the detection data by application of the first data-processing measure.

The application of the first data-processing measure can include the application of at least one selection algorithm, which may form part of a selection software, and which may be, for example, an image processing algorithm. A corresponding selection or image processing algorithm can be set up to select exactly one object 2.1 from the plurality of objects 2 located in the first orientation and/or position described by the detection data.

The selection algorithm may be generated or may have been generated in the context of a machine learning process, i.e. via a machine learning method. In the context of a corresponding machine learning process, one or more artificial neural networks with one or more intermediate layers implemented between an input layer and an output layer may be used or may have been used.

In a third method step of the method S3, a second data-processing measure is applied to process the selection information generated in the second method step of the method S2. The selection information generated in the second method step of the method S2 is thus processed in the third method step of the method S3 on the basis of a second data-processing measure. The application of the second data-processing measure, carried out in particular by the data-processing device or by a further data-processing device implemented in terms of hardware and/or software, provides as a result at least one coordinate K for handling the exactly one object 2.1 described by the selection information by means of a handling element 6 of the handling device 7 of the industrial robot 3 (cf. FIG. 4). The result of the application of the second data-processing measure is thus generated coordinate information which includes or describes at least one coordinate K for handling the exactly one object 2.1 described by the selection information by means of a handling element 6 of the handling device 7 of the industrial robot 3. The generated coordinate information thus includes or describes one or more coordinates—these are, for example, world coordinates related to the particular object 2.1—for handling the exactly one object 2.1 described by the selection information by means of a handling element 6 of the handling device 7 of the industrial robot 3.

The application of the second data-processing measure can include the application of at least one determination algorithm, which may form part of a determination software, and which may be, for example, an image processing algorithm. A corresponding determination or image processing algorithm can be set up to determine, at the object 2.1 described by the selection information, suitable coordinates at which the object 2.1 can be handled, i.e. for example gripped, by means of a handling element 6 of the handling device 7 of the industrial robot 3.

The determination algorithm may be generated or may have been generated as part of a machine learning process, i.e. via a machine learning method. In the context of a corresponding machine learning process, one or more artificial neural networks with one or more intermediate layers implemented between an input layer and an output layer may be used or may have been used.

In a fourth method step of the method S4, the coordinate information generated in the third method step of the method S3 is used as the basis for controlling the operation of the industrial robot, so that the industrial robot 3 applies the relevant handling element 6 of the handling device 7 at the coordinate or coordinates K described by the coordinate information in order to relocate the object 2.1 from the first orientation and/or position into a second orientation and/or position. The second orientation and/or position can be specified, for example, by a user or programmer of the industrial robot.

Accordingly, controlling the operation of the industrial robot 3 typically includes or results in handling exactly the one object 2.1 described by the selection information at the coordinate or coordinates K described by the coordinate information.

Controlling the operation of the industrial robot 3 on the basis of the coordinate information can comprise at least one interaction of a handling element 6 of the handling device 7 of the industrial robot 3 with the object 2.1 described by the respective selection information and thus selected at or in the region of the coordinate(s) K described by the coordinate information. A corresponding interaction can comprise picking up ("picking") the object 2.1 described by the respective selection information and thus selected at the coordinate(s) K described by the particular coordinate information. In particular, controlling the operation of the industrial robot 3 on the basis of the coordinate information can comprise relocating the object 2.1 described and thus selected by the respective selection information from the first orientation and/or position to a second orientation and/or position by means of a handling element 6 of the handling device 7 of the industrial robot 3.

The main advantage of the method is that already in the second step of the method S2 a corresponding selection of exactly one object 2.1 is selected from the plurality of detected objects 2 described by the detection data. In this way, the data volume to be processed in order to determine the particular coordinates K can be considerably reduced or limited to a single object, namely the selected object 2.1, which also considerably reduces the data-processing resources required to generate corresponding control information, i.e. in particular the memory and computing resources.

The method thus already makes it possible in the second step of the method S2, and thus comparatively early, to considerably reduce the data volume to be processed for generating corresponding coordinate information by selecting exactly one object 2.1 from the plurality of objects 2 located in the first orientation and/or position described by the detection data by applying the first data-processing measure. By selecting exactly one object 2.1 from the plurality of objects 2 located in the first orientation and/or position described by the detection data in the second step of the method S2, the data volume of the data to be processed further is reduced to exactly the selected object 2-1; the data defined by the selection information and to be processed further is thus limited or concentrated to the exactly one particular selected object 2.1, so that the further processing of the data is also limited or concentrated only to the exactly one particular selected object 2.1.

Due to the reduced data volume, the method can be carried out significantly faster and the required data-processing resources, i.e. in particular the required memory and computing resources, are significantly reduced. Alternatively or additionally, less powerful data-processing devices can be used to perform the method, in particular in terms of memory and computing power, if appropriate.

The first data-processing measure can be implemented by a single- or multi-layer first artificial neural network. A corresponding first artificial neural network comprises at least one intermediate layer located between an input layer and an output layer. In principle, artificial neural networks of (comparatively) simple or (comparatively) complex configuration can be used to implement the first data-processing measure.

Alternatively or additionally, the second data-processing measure can be implemented by a single- or multi-layer second artificial neural network. A corresponding second artificial neural network has at least one intermediate layer located between an input layer and an output layer. In principle, artificial neural networks of (comparatively) simple or (comparatively) complex configuration can be used to implement the second data-processing measure.

Respective data-processing devices for the application of the first and second data-processing measures can thus be set up to implement at least one first artificial neural network and/or at least one second artificial neural network or to be implemented by corresponding first and/or second artificial neural networks. The respective data-processing device can form part of the control device 11 for controlling the operation of the industrial robot 3.

At least one selection criterion can be taken into account in the application of the first data-processing measure. Thus, the selection of exactly one object 2.1 from the plurality of objects 2 located in the first orientation and/or position described by the detection data taking place by means of the first data-processing measure can be performed on the basis of at least one selection criterion.

Absolute orientation information and/or absolute position information describing an absolute orientation and/or position of at least one object 2 of the objects 2 located in the first orientation and/or position can be used as a corresponding selection criterion, for example.

Alternatively or additionally, relative orientation information and/or relative position information describing a relative orientation and/or position of at least one object 2 of the objects 2 located in the first orientation and/or position with respect to at least one further object 2 of the objects 2 located in the first orientation and/or position can be used as a corresponding selection criterion, for example.

Alternatively or additionally, approach information describing an approach movement or approach vector of a handling element 6 of the handling device 7 of the industrial robot 3 required in particular from an ACTUAL position and/or ACTUAL orientation for approaching at least one object 2 of the objects 2 located in the first orientation and/or position can be used as a corresponding selection criterion.

Alternatively or additionally, dimension information describing at least one geometric-structural dimension of at least one object 2 of the objects 2 located in the first orientation and/or position can be used as a corresponding selection criterion.

Alternatively or additionally, shape information describing at least one geometric-structural shape (spatial shape) of at least one object 2 of the objects 2 located in the first orientation and/or position can be used as a corresponding selection criterion.

Alternatively or additionally, color information describing the coloring of at least one object 2 of the objects 2 located in the first orientation and/or position can be used as a corresponding selection criterion.

Alternatively or additionally, surface information describing the surface, in particular the surface condition, i.e. in particular the mechanical and/or optical surface properties, of at least one object 1 of the objects 2 located in the first orientation and/or position can be used as a corresponding selection criterion.

Alternatively or additionally, mass information describing the mass, in particular a center of mass, of at least one object 2 of the objects 2 located in the first orientation and/or position can be used as a corresponding selection criterion.

Alternatively or additionally, type information describing the type, sometimes also referred to as the "format" in pick-and-place applications, of at least one object 2 of the objects 2 located in the first orientation and/or position can be used as a corresponding selection criterion.

At least one determination criterion can be taken into account in the application of the second data-processing measure. Thus, the determination of the at least one coordinate for handling the exactly one object 2.1 described by the selection information by means of the second data-processing measure can be performed on the basis of at least one determination criterion.

Absolute orientation information and/or absolute position information describing an absolute orientation and/or position of the selected object 2.1 can be used as a corresponding determination criterion, for example.

Alternatively or additionally, relative orientation information and/or relative position information describing a relative orientation and/or position of the selected object 2.1 with respect to at least one further object 2 of the objects 2 located in the first orientation and/or position can be used as a corresponding determination criterion, for example.

Alternatively or additionally, approach information describing an approach movement or approach vector of a handling element 6 of the handling device 7 of the industrial robot 3, in particular required from an ACTUAL position and/or ACTUAL orientation, can be used as a corresponding determination criterion for approaching the selected object 2.1.

Alternatively or additionally, dimension information describing at least one geometric-structural dimension of the selected object 2.1 can be used as a corresponding determination criterion.

Alternatively or additionally, shape information describing at least one geometric-structural shape (spatial shape) of the selected object 2.1 can be used as a corresponding determination criterion.

Alternatively or additionally, color information describing the coloring of the selected object 2.1 can be used as a corresponding determination criterion.

Alternatively or additionally, surface information describing the surface, in particular the surface condition, i.e. in particular the mechanical and/or optical surface properties, of the selected object 2.1 can be used as a corresponding determination criterion.

Alternatively or additionally, mass information describing the mass, in particular a center of mass, of the respectively selected object 2.1 can be used as a corresponding determination criterion.

Alternatively or additionally, handling information describing the type of handling of the respectively selected object 2.1 by a handling element 6 of the handling device 7 of the industrial robot 3 can be used as a corresponding determination criterion.

Alternatively or additionally, handling information describing the handling surface of the respectively selected object 2.1 by a handling element 6 of the handling device 7 of the industrial robot 3 can be used as a corresponding determination criterion.

Alternatively or additionally, type information describing the type of the respectively selected object 2.1 can be used as a corresponding determination criterion.

The method typically does not end after performing of the described steps S1-S4 for a first selected object 2.1, which was selected within the context of or after performing of the steps of the method described further above, for example, from the plurality of objects 2 located in the first orientation and/or position and was removed as a selected object in the course of controlling the industrial robot from the plurality of objects 2 located in the first orientation and/or position and relocating into a second orientation and/or position. Accordingly, after generating corresponding selection information and coordinate information for a first selected object 2.1, corresponding selection information and coordinate information for at least one further object 2 is typically generated from the plurality of objects 2 remaining in the first orientation and/or position. The method is typically performed until corresponding selection information and coordinate information has been successively generated for each object 2 from the plurality of objects 2 remaining in the first orientation and/or position. The process can be interrupted or stopped if a termination condition is fulfilled or present. A corresponding termination condition can be fulfilled or present, for example, if only a certain number of objects 2 located in the first orientation and/or position are still present or if no object 2 located in the first orientation and/or position is present any more.

Before the step S1 of detecting the plurality of objects 2 located in a first orientation and/or position and generating a detection data describing the detected plurality of objects 2 located in the first orientation and/or position, the method can comprise a step of providing a plurality of objects 2 in a first orientation and/or position on a stationary or moving support, in particular a feed conveyor 4. Thus, at least optionally, the provision, which may include feeding particular objects 4 into the action region 5 of a handling element 6 of the handling device 7 of the industrial robot, may also constitute a step of the method.

In all exemplary embodiments, corresponding objects 2 can be objects to be packaged in a packaging. The type of packaging is dependent on the type of objects to be packaged. Only by way of example is reference made to singulatable foodstuffs, such as confectionery, as possible objects 2.

The invention claimed is:
1. A method for controlling the operation of an industrial robot configured for carrying out pick-and-place or singulation tasks, wherein the industrial robot comprises a handling device, which comprises at least one handling element movable in at least one degree of freedom of movement for handling an object to be relocated from a first orientation and/or position into a second orientation and/or position, the method comprising the following steps:
    detecting a plurality of objects located in the first orientation and/or position and generating detection data describing the detected plurality of objects located in the first orientation and/or position;

applying a first data-processing measure for processing the detection data, wherein applying the first data-processing measure provides a selection of exactly one object from the plurality of objects located in the first orientation and/or position described by the detection data, and generating selection information describing the exactly one object selected from the plurality of objects located in the first orientation and/or position described by the detection data;

applying a second data-processing measure for processing the selection information, wherein applying the second data-processing measure provides at least one coordinate for handling the exactly one object described by the selection information by means of at least one handling element of the handling device of the industrial robot, and generating coordinate information describing the at least one coordinate; and controlling the operation of the industrial robot to carry out a pick-and-place or singulation task, based on the coordinate information, wherein:

the detection of the plurality of objects located in the first orientation and/or position is carried out by means of at least one optical detection device;

the first data-processing measure is implemented by a single-layer first artificial neural network, a multi-layer first artificial neural network, a single-stage first artificial neural network, or a multi-stage first artificial neural network;

the second data-processing measure is implemented by a single-layer artificial second neural network, a multi-layer second artificial neural network, a single-stage second artificial neural network, or a multi-stage second artificial neural network;

at least one data-processing device set up for applying the first and second data-processing measures is used for applying the first and second data-processing measures;

the selection of exactly one object from the plurality of objects located in the first orientation and/or position described by the detection data taking place by means of the first data-processing measure is performed on the basis of at least one selection criterion;

a determination takes place by means of the second data-processing measure of the at least one coordinate for handling the exactly one object described by the selection information is performed on the basis of at least one determination criterion; and the controlling of the operation of the industrial robot on the basis of the coordinate information comprises an interaction of the at least one handling element of the handling device of the industrial robot with the object described by the respective selection information at or in the region of the at least one coordinate described by the coordinate information.

2. The method according to claim 1, wherein the at least one optical detection device is arranged or formed on the industrial robot on an immovable or stationary portion of the industrial robot on a portion of a housing device of the industrial robot set up to receive functional and/or supply components of the industrial robot.

3. The method according to claim 1, wherein the at least one optical detection device has a defined optical detection region within which objects can be detected or are detected by means of the optical detection device.

4. The method according to claim 3, wherein the defined optical detection region of the at least one optical detection device at least in sections within a defined action space, within which the at least one handling element of the handling device is movable.

5. The method according to claim 1, wherein the following is used as the at least one selection criterion:

absolute orientation information and/or absolute position information describing an absolute orientation and/or position of at least one object of the objects located in the first orientation and/or position; and/or relative orientation information and/or relative position information describing a relative orientation and/or position of at least one object of the objects located in the first orientation and/or position with respect to at least one further object of the objects located in the first orientation and/or position;

and/or approach information describing an approach movement or approach vector, necessary from an actual position and/or actual orientation, of a handling element of the handling device of the industrial robot required for approaching at least one object of the objects located in the first orientation and/or position; and/or dimension information describing at least one dimension of at least one object of the objects located in the first orientation and/or position; and/or shape information describing at least one shape of at least one object of the objects located in the first orientation and/or position; and/or color information describing the coloring of at least one object of the objects located in the first orientation and/or position; and/or surface information describing a surface condition of at least one object of the objects located in the first orientation and/or position; and/or mass information describing a center of mass of at least one object of the objects located in the first orientation and/or position; and/or type information describing the type of at least one object of the objects located in the first orientation and/or position.

6. The method according to claim 1, wherein the following is used as the at least one determination criterion:

absolute orientation information and/or absolute position information describing an absolute orientation and/or position of the selected object; and/or relative orientation information and/or relative position information describing a relative orientation and/or position of the selected object with respect to at least one further object of the objects located in the first orientation and/or position; and/or approach information for approaching the selected object, describing an approach movement or approach vector of the at least one handling element of the handling device-of the industrial robot, required from an actual position and/or actual orientation; and/or dimension information describing at least one dimension of the selected object; and/or shape information describing at least one shape of the selected object; and/or color information describing the coloring of the selected object; and/or surface information describing a surface condition of the selected object; and/or mass information describing a center of mass of the selected object; and/or handling information describing the type of handling of the selected object by at least one handling element of the handling device of the industrial robot; and/or handling information describing the handling surface of the selected object by at least one handling element of the handling device of the industrial robot; and/or type information describing the type of the selected object.

7. The method according to claim 1, wherein the controlling of the operation of the industrial robot on the basis of the coordinate information comprises a relocating of the object described by the respective selection information from the first orientation and/or position to the second orientation and/or position by means of the at least one handling element of the handling device of the industrial robot.

8. The method according to claim 1, wherein following the generation of corresponding selection information and coordinate information for a first object from the plurality of objects remaining in the first orientation and/or position, corresponding selection information and coordinate information is generated for another object from the plurality of objects located in the first orientation and/or position.

9. The method according to claim 1, wherein a collaborative industrial robot is used as the industrial robot.

10. An industrial robot comprising the at least one handling device, which comprises the at least one handling element, which can be moved in the at least one degree of freedom of movement, for handling the object to be relocated from the first orientation and/or position into the second orientation and/or position, and a control device implemented in hardware and/or software, for controlling the operation of the industrial robot, wherein the control device is set up for performing the method according to claim 1.

11. An assembly for relocating objects from a first orientation and/or position to a second orientation and/or position, comprising:
   at least one industrial robot according to claim 10; and
   at least one feed device for feeding objects located in the first orientation and/or position, into an action region of the at least one handling element of the handling device of the industrial robot, and/or
   at least one outlet device for the outlet of objects relocated into the second orientation and/or position by means of the industrial robot.

* * * * *